3,156,729
SYNTHESIS OF DIAMINES
Irving L. Mador and Louis J. Rekers, Cincinnati, Ohio, assignors to National Distillers and Chemical Corporation, New York, N.Y., a corporation of Virginia
No Drawing. Filed Sept. 4, 1958, Ser. No. 758,901
2 Claims. (Cl. 260—583)

The present invention relates to an improved process for preparation of diamino derivatives of dimers of diolefins including aliphatic diolefins, cycloaliphatic diolefins, and the like. More specifically, the invention relates to a process for production from butadiene of diamino dimers of butadiene.

In copending application Serial No. 514,399, filed June 9, 1955 (now abandoned), a process is disclosed whereby a conjugated diene is subjected to reaction in an aqueous medium in presence of free amino radicals generated in situ under conditions to produce a reaction mixture comprising a diamino product corresponding to addition of one amino radical per unit of the diolefin in a dimer thereof. In a specific embodiment, butadiene is reacted in an aqueous medium with free amino radicals generated in situ to produce a reaction product comprising a diamino octadiene which, if desired, can be hydrogenated to the corresponding saturated $C_8$ diamine. In copending application Serial No. 586,636, filed May 23, 1956 (now U.S. Patent No. 3,062,886, issued Nov. 6, 1962), a process is disclosed that is an improvement over that of Serial No. 514,399 in that, by use of a controlled amount of a suitable solvent to the amount of water in the reaction mixture, marked and unexpected improvements in yield of the desired diamino dimer product are obtained. In still another copending application, Serial No. 609,807, filed September 14, 1956 (now U.S. Patent No. 2,991,312, issued July 4, 1961), and of which the present application is a continuation-in-part, a process is disclosed for preparation of such diamino dimers of conjugated diolefins in a substantially "non-aqueous" reaction system whereby recovery of the desired product is accomplished in a simplified and more economic manner along with obtainment of additional advantages.

Within the scope of such processes wherein the conjugated diolefin is reacted with the free amino radicals formed in situ by oxidation-reduction reaction of a hydroxylamine with a reducing metal ion from a salt of such a metal, and examples of which include titanous chloride, titanous acetate, stannous chloride, manganous chloride, vanadous chloride, etc., a substantially mole to mole ratio of the hydroxylamine to the metal salt is required, as illustrated by the following equation:

$$NH_2OH + Ti^{+3} \rightarrow Ti^{+4} + NH_2 \cdot + OH^-$$

In other words, the hereinbefore disclosed processes include extraneous preparation of the metal salt in which the metal is in a lower valent form so as to function as a reducing agent, and addition thereof to the reaction mixture containing the hydroxylamine and conjugated diolefin, or the hydroxylamine is preferably added simultaneously with the reducing metal salt. As illustrated by the foregoing equation, the reducing metal (following reaction with the hydroxylamine) is converted to a higher valent non-reducing form and in the case of titanous chloride (TiCl₃) to TiCl₄ which upon removal from the reaction mixture, is extraneously reduced to TiCl₃ and recycled to the reaction mixture. As the reducing metal salt represents an expensive component of such a process, desiderata are methods for effecting the selective dimerization reaction with markedly reduced requirements for the amount of metal salt not only from economic considerations but, additionally, as use of markedly reduced amounts of the metal salt facilitate processing for separation of the metal salt from the reaction mixture. Illustrated by the use of titanous chloride as the salt of the reducing metal, difficulties are presented in separation of the resulting titanium tetrachloride from the desired diamino dimer product in the reaction mixture.

The process embodied herein is directed to a liquid phase process wherein a diolefinic aliphatic hydrocarbon, and particularly a lower molecular weight aliphatic diolefinic hydrocarbon, is reacted with free amino radicals generated in situ by oxidation-reduction reaction of a hydroxylamine and a reducing metal ion from a reducing metal salt and, in which process, the metal salt can be used in markedly reduced amount by carrying out the process under conditions whereby the metal salt, upon conversion in the reaction to its higher valent, non-reductive state, is converted in situ to its reductive state. As embodied herein, the process comprises carrying out the aforedefined reaction under conditions for reducing in situ the higher valent, non-reductive metal salt formed in the reaction by either of a plurality of methods found suitable therefor and inclusive of which are carrying out of the process, simultaneous with formation of the desired diamino product, with catalytic hydrogenation, electrolytic reduction, or use of a suitable metal to reduce the higher valent metal salt, as formed in the reaction, to a reductive state.

For providing free amino radicals, the hydroxylamine is preferably used in the form of a salt and, more preferably, as a salt of hydroxylamine soluble in the reaction medium, inclusive of which are inorganic acid salts such as hydroxylamine hydrochloride, hydroxylamine sulfate, hydroxylamine acetate, etc., as well as mono and dis-substituted hydroxylamines of the general formula

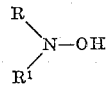

where R and R¹ are organic radicals, examples of which are N-benzyl hydroxylamine and N-phenyl hydroxylamine, or where R and R¹ together form a substituted methylene group of the structure R″=NOH, an example of which is acetone oxime. For the reducing metal ion, metal ions including titanous, stannous, manganous, vanadous, chromous, molybdenous and the like, may be used in the form of salts thereof, as, for example, inorganic salts such as chlorides, sulfates, etc. and organic salts, such as acetates, etc. Thus, in practice of this invention, the reaction may be initiated by adding to the reaction mixture a higher valent, non-reducing salt of such metals (e.g., $TiCl_4$) whereupon, since the reaction is carried out under conditions whereby such a salt is reduced, the higher valent metal salt is reduced in situ to function as a reducing agent for the hydroxylamine. If desired, the metal salt can be initially added as the lower valent reducing form (e.g., titanous chloride) whereupon, in its conversion to the higher valent form during the reaction, it is reduced in situ to the reducing metal form (e.g., $TiCl_3$).

In carrying out the process of this invention, the reaction between the diolefin and the free amino radicals is carried out in presence of a solvent that is inert with respect to the reactants and the diamine product. For such a purpose, organic solvents including certain oxygen-containing organic solvents are preferred such, for example, hydroxylic organic solvents, including the alcohols of the methanol series and particularly the relatively low molecular weight members of that series such as methanol, ethanol, isopropanol, and the like; and, generally, such alcohols of from 1 to 4 carbon atoms.

The process embodied herein may be carried out with use of a diene of which butadiene is particularly well adapted. However, the process may be carried out with use of other conjugated dienes, including for example, such dienes of from four to eight carbon atoms and, specific examples of which include isoprene, dimethyl butadiene, the pentadienes, such as methyl 1,3-pentadiene, as well as cyclic dienes such as cyclohexadiene-1,3-pentadiene and cyclopentadiene.

For the described reaction carried out under conditions to effect the desired in situ reduction of the metal salt, the temperature employed may be varied over a rather wide range such, for example, from $-30°$ to $100°$ C. with a preferred range being $0°$ to $60°$ C. Though temperatures lower than about $0°$ C. can be used, they are generally not preferred as the reaction rate tends to decrease whereas temperatures higher than about $60°$ C., such as may be used by carrying out the reaction under pressure, are suitable due to an increase in rate of reaction but use of more expensive pressurized vessels is required.

In one embodiment, the reaction is carried out in the presence of a hydrogenation catalyst and hydrogen using, for example, hydrogen pressures of from about atmospheric to 5000 p.s.i. with a preferred range being about 300 to about 1000 p.s.i. and at from about room temperature up to about $100°$ C., and preferably up to about $60°$ C.

In another embodiment, the process is carried out under electrolytic conditions for reduction of the higher valent form of the metal salt and, for such a process, a range of current densities of from about 0.01 to about 0.5 ampere/cm.$^2$ may be used with a preferred range being about 0.05 to about 0.2 and at a temperature maintained at from about $10°$ to $60°$ C.

In still another embodiment, the desired reduction of the metal salt is effected by carrying out the process in presence of a metal higher in the electromotive series of elements than the metal of the salt to be reduced in the reaction mixture. Thus, for reducing $TiCl_4$, suitable metals include zinc, aluminum, tin, iron and others whereas, for reducing other metal salts such as $CrCl_3$, reducing metals include zinc and aluminum. Usually, a temperature of from about $10°$ to $60°$ C. is suitable for such a reaction with the lesser active metals usually requiring a higher temperature than a more active metal. Thus, for reduction of $TiCl_4$, a higher temperature is generally employed when a less active metal such as iron is used as compared to a more active metal such as zinc.

In order to further describe the invention, several embodiments thereof are set forth hereinafter. With respect thereto, however, it should be understood that such embodiments are set forth for illustrative and not limitative purposes.

Example 1

A solution was prepared containing 0.036 mole titanium tetrachloride, 0.250 mole hydroxylamine and 0.325 mole butadiene in 100 ml. methanol. The solution was hydrogenated at 1000 p.s.i. hydrogen pressure with Adams' catalyst i.e. a platinum catalyst which is obtained when platinum oxide is exposed to hydrogen "Catalysis," vol. V, page 177, edited by Paul H. Emmett, Reinhold Publishing Corp. (1957), whereby there was produced a reaction mixture containing a 24% yield of diaminooctane, based on the hydroxylamine consumed.

Example 2

Anhydrous hydrochloric acid was added to methanol to make a 2 N solution. Hydroxylamine hydrochloride (25 g. or 1.36 moles) was dissolved in this solution, then 1.44 moles butadiene (four times theory) was condensed into the vesssel by cooling. Finally, 1.98 ml. titanium tetrachloride (0.018 mole or 5 percent based on hydroxylamine) was added. The solution was placed in an autoclave with 100 mg. Adams' catalyst at an initial pressure of 400 p.s.i. During the course of the reaction, the solution was permitted to warm up to room temperature. The final pressure was 280 p.s.i. and the color of the solution was blue indicating that all the hydroxylamine had been consumed.

The solution was reduced in volume by evaporation, following which water and then caustic were added. The resulting diamine layer was taken up in isopropanol and the aqueous layer further extracted with isopropanol. Removal of the isopropanol by distillation gave 18.4 g. of crude diamine, or a 73% yield of diaminooctane.

Example 3

An autoclave was charged with the following mixture: 250 ml. methanol 2 N in hydrochloric acid, 17.5 g. (0.25 mole) hydroxylamine hydrochloride, 1.38 ml. (0.0125 mole) titanium tetrachloride, and 1.0 mole butadiene. Prereduced Adams' catalyst (100 mg.) in methanol was added and the autoclave pressurized to 50 p.s.i. with hydrogen. At the end of the reaction the product was isolated as in the preceding example. The crude product (26.1 g.) was distilled at 0.005 mm. pressure yielding a first cut of $C_8$ diamine boiling in the range $42°$ to $85°$ C.

Example 4

A solution was prepared of 20 g. (0.288 mole) hydroxylamine hydrochloride and 15.8 ml. (0.144 mole) titanium tetrachloride dissolved in 320 ml. methanol, which had previously been made 2 N in anhydrous hydrochloric acid. The electrolytic cell consisted of a 55 x 150 mm. porous Alundum crucible in a 400 ml. tall form beaker. The anode was platinum gauze; the cathode, a strip of 1.2 x 34 cm. lead sheet wound as a spiral. A magnetic bar stirrer was used to agitate the contents of the crucible which was the cathode compartment.

The above solution was electrolyzed in two runs, each lasting two hours and twenty minutes. One-half of the solution was added to the cathode cup, and methanol made 2 N in anhydrous hydrochloric acid served as the anolyte. During the course of the electrolysis, butadiene was condensed into the cathode in amount 3.9 times that theoretically required. The cathode temperature was in the range of $24°$ to $26°$ C. The current was held at 2.0 amperes and the voltage varied from 4.2 to 5.0 volts. The final solutions were blue due to titanous ion, indicating all the hydroxylamine was destroyed.

The cathode solutions from the two runs were combined and part of the methanol removed by evaporation. Water was added and then caustic to bring the final solution to a 25% concentration in sodium hydroxide, making an allowance for the amount required to neutralize the hydrochloric acid and titanium tetrachloride.

The slurry was extracted with isopropanol to remove the diamine. After evaporation of the solvent, 14.1 g. of crude product was obtained corresponding to a 70% yield based on the hydroxylamine consumed. On distillation at reduced pressure 9.7 g. of octadiene diamine was obtained corresponding to a yield of 48% of theory.

Example 5

A mixture of 200 ml. of methanol 2 N in hydrochloric acid, 10.4 g. (0.15 mole) hydroxylamine hydrochloride, 2.4 ml. titanium tetrachloride, 0.45 mole of butadiene and 9.9 g. of zinc shot cooled to $-30°$ C. was charged to an autoclave. The mixture was allowed to warm to room temperature before shaking was begun. At the conclusion of the reaction, the metal ions were precipitated by addition of caustic and the diamine recovered by extraction with isopropanol. The yield of crude diaminooctadiene was 6.7 g. or 65 percent of theory based on the hydroxylamine charged.

Example 6

A reaction flask was charged with 50 ml. of methanol, 17.4 g. (0.25 mole) hydroxylamine hydrochloride, 2.7 ml. (0.025 mole) of titanium tetrachloride and 9.8 g. of zinc dust. Over a five minute period 180 ml. of methanol 2 N in hydrochloric acid was added to the flask, and 0.50 mole butadiene condensed in by means of a Dry Ice reflux condenser. Rapid stirring and external cooling were supplied and the reaction temperature was in the range 20° to 24° C. At the end of the five minute period, solution of the zinc was essentially complete. Eleven percent of the hydroxylamine was found to be remaining. The crude yield of 10.5 g. represented 68 percent of theory, based on the hydroxylamine consumed, of $C_8$ diamine.

*Example 7*

A reaction was carried out similar to Example 6 using 8.4 g. of 100 mesh iron powder instead of zinc. The amount of butadiene was increased to 0.75 mole. The addition time was 10 minutes and the temperature 10° C. from which there was obtained a 44 percent of theory yield of diaminooctadiene.

*Example 8*

A reaction was carried out similar to Example 7 but on a 40 percent larger scale and using 24.9 g. of 50 mesh tin in place of iron. The yield of diamine octadiene was 10 percent of theory based on the hydroxylamine charged.

Irrespective of the method used for effecting the desired in situ reduction of the metal salt, the process embodied herein enables utilization of substantially less than an equivalent amount of the metal salt for reduction of the hydroxylamine. Generally, the amount of metal salt employed may range from one to 20 mole percent based on the amount of hydroxylamine or hydroxylamine salt that is employed and, preferably, a range of from about 2 to about 10 mole percent. With respect to the proportional amounts of the diolefin and hydroxylamine, substantially equivalent amounts thereof may be used but, preferably, an excess of the diolefin such as up to about 8 equivalents is satisfactory and, preferably, from about 2 to about 4 equivalents, with the excess diolefin being recovered at the end of the reaction.

The process embodied herein can be carried out, if desired, in an aqueous medium containing a solvent as aforedefined with water being added initially if desired, or as an aqueous solution of the hydroxylamine reactant. Preferably, when a water-soluble hydroxylamine salt is used, addition of water is preferred to increase the solubility of the hydroxylamine salt in the reaction mixture. Such addition of water is particularly preferred in cases where the reaction medium contains a higher alcohol as a solvent for the diolefin.

For obtaining optimum yields of the desired diamino dimer product, addition of an acid is preferred and in some cases required. For such a purpose, examples of acids include hydrochloric, sulfuric, and acetic, and generally, in a concentration to provide a normality of from about 1 N to about 6 N with a preferred range being 2 N to 4 N. For such a purpose, anhydrous or aqueous acid solutions may be used.

The diamino products produced by practice of this invention possess utility for many purposes and, particularly, are suitable upon hydrogenation to provide saturated, relatively high molecular weight amines that are useful for reaction with dibasic acids, such as sebacic acid, adipic acid and the like, to form synthetic linear polyamides that are fiber-forming into fibers of excellent cold-draw characteristics. For example, the $C_8$ unsaturated diamines produced by certain embodiments described and subjected to hydrogenation to the corresponding saturated $C_8$ diamines, as well as the $C_8$ saturated diamines produced directly in the catalytic hydrogenation embodiment, provide upon being subjected to condensation polymerization reactions with an acid such as sebacic acid, adipic acid, and the like, synthetic linear condensation polyamides that are fiber-forming to fibers of excellent cold-draw characteristics.

Although it is not intended that the invention be bound by any theory as to the particular reactions that occur in the processing of conjugated dienes to produce the diamino derivatives thereof as embodied herein, it is believed that the following reactions occur when, for illustrative purposes, the reactants include butadiene and the free radical is an $NH_2\cdot$ radical such as formed by oxidation-reduction reaction of hydroxylamine hydrochloride and titanous chloride.

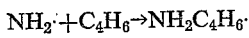

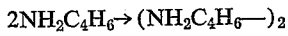

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. In a process for preparing a diamino dimer of butadiene by maintaining in liquid phase a reaction mixture comprising butadiene and a lower molecular weight alcohol of the methanol series and, in said mixture maintained at a temperature below about 100° C. and a pressure up to about 5,000 p.s.i., reacting hydroxylamine with titanous chloride whereby the titanous ion is oxidized to titanic ion, the improvement which comprises carrying out said reaction using an amount of butadiene of from about one to about eight equivalents per equivalent of hydroxylamine and an amount of titanous chloride substantially less than equivalent to said hydroxylamine in the presence of hydrogen and a platinum hydrogenation catalyst to reduce simultaneously in situ the titanic ion that forms by reduction of the hydroxylamine with the titanous ion.

2. A process, as defined in claim 1, wherein an acid is added to the reaction mixture to provide a normality of of from 1 N to 6 N.

References Cited in the file of this patent

UNITED STATES PATENTS

| | | |
|---|---|---|
| 2,532,277 | Castle | Dec. 5, 1950 |
| 2,540,938 | Finch et al. | Feb. 6, 1951 |
| 2,567,109 | Howard | Sept. 4, 1951 |
| 2,632,729 | Woodman | Mar. 24, 1953 |
| 2,726,204 | Park et al. | Dec. 6, 1955 |
| 2,991,312 | Mador et al. | July 4, 1962 |

OTHER REFERENCES

Schumb et al.: Journal American Chemical Society, vol. 55, pages 596–597 (1933).

Davis et al.: Journal of the Chemical Society (London), vol. III, pages 2563–2567 (1951).

Remy: "Treatise on Inorganic Chemistry," vol. 1, p. 760 (1956).